(12) United States Patent
Kuehnl et al.

(10) Patent No.: US 11,758,246 B2
(45) Date of Patent: *Sep. 12, 2023

(54) METHOD AND DEVICE FOR FILLING VIDEO AD REQUESTS WITH VIDEO AD CONTENT TRANSCODED IN REAL TIME TO A STREAM AT A TEMPORARY URL

(71) Applicant: Beachfront Media, LLC, Ormond Beach, FL (US)

(72) Inventors: Todd Kuehnl, Chicago, IL (US); Frank Sinton, Ormond Beach, FL (US)

(73) Assignee: Beachfront Media, LLC, Ormond Beach, FL (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/135,830

(22) Filed: Dec. 28, 2020

(65) Prior Publication Data

US 2021/0360334 A1 Nov. 18, 2021

Related U.S. Application Data

(63) Continuation of application No. 13/843,151, filed on Mar. 15, 2013, now Pat. No. 10,880,621.

(51) Int. Cl.
*H04N 21/858* (2011.01)
(52) U.S. Cl.
CPC .............. *H04N 21/8586* (2013.01)
(58) Field of Classification Search
CPC ......... H04N 21/8586; H04N 21/25808; H04N 21/812; H04N 21/2343
See application file for complete search history.

(56) References Cited

U.S. PATENT DOCUMENTS

| 2006/0271977 | A1 | 11/2006 | Lerman et al. |
| 2013/0219426 | A1 | 8/2013 | Zweig et al. |
| 2013/0268963 | A1* | 10/2013 | Nugent ............... H04N 21/812 725/32 |
| 2013/0318193 | A1 | 11/2013 | Koli et al. |

FOREIGN PATENT DOCUMENTS

WO WO-2012091731 A2 * 7/2012 ......... G06Q 30/0241

OTHER PUBLICATIONS

Iab. Video Ad Serving Template (VAST). Version 3.0. 2012 Jul. 2012. 71 pages.
Iab. Digital Video Ad Serving Template (VAST). Version 2. Nov. 2009. 16 pages.
MeFeedia vast2RegularLinear from XML. Retrieved Mar. 2013. 1 page.
Iab Vast, Video Ad Serving Template, video xml ad response, Version 3.0.0, xml schema prepared by Google</xs: documentation, http://www.iab.net/media/file/vast3_draft.xsd.zip, retrieved Apr. 2012, 38 pages.

* cited by examiner

*Primary Examiner* — Jeff A Burke
*Assistant Examiner* — Sihar A Karwan
(74) *Attorney, Agent, or Firm* — Haynes Beffel & Wolfeld LLP; Ernest J. Beffel, Jr.; Jason Liao

(57) ABSTRACT

The technology disclosed relates to filling video ad requests with video ad content that begins in a format incompatible with the mobile device that is requesting the ad content. In particular, it relates to accessing available on ad content, transcoding the ad content to a video stream and publishing the video stream to the mobile device that requested the head content. This sometimes requires synchronization between a player on the mobile device and the video stream transcoder.

17 Claims, 3 Drawing Sheets

FIG. 2

```
<?xml version="1.0" encoding="UTF-8" ?>
<VAST version="2.0">
<Ad id="preroll-1">
<InLine>
<AdSystem>2.0</AdSystem>
<AdTitle>5748406</AdTitle>
<Impression id="blah">
- <![CDATA[
http://b.scorecardresearch.com/b?C1= ***
]]>
</Impression>
<Creatives>
<Creative>
<Linear>
<Duration>00:00:30</Duration>
<TrackingEvents />
<VideoClicks>
<ClickThrough id="scanscout">
- <![CDATA[
http://www.target.com
]]>
</ClickThrough>
</VideoClicks>
<MediaFiles>
<MediaFile height="396" width="600" bitrate="496" type="video/x-
 flv" delivery="progressive">
- <![CDATA[
http://media.scanscout.com/ads/partner1_a1d1fbbc-c4d4-
 419f-b6c8-e9db63fd4491.flv
]]>
</MediaFile>
</MediaFiles>
</Linear>
</Creative>
<Creative>
<CompanionAds>
<Companion height="250" width="300" id="555750">
<HTMLResource>
 <![CDATA[
 <A onClick="var i= new Image(1,1); i.src='http://
 app.scanscout.com/ssframework/log/log.png?a=logitemaction
 *** height="1" width="1">
]]>
</HTMLResource>
***
</InLine>
</Ad>
</VAST>
```

200

250

METHOD AND DEVICE FOR FILLING VIDEO AD REQUESTS WITH VIDEO AD CONTENT TRANSCODED IN REAL TIME TO A STREAM AT A TEMPORARY URL

CROSS-REFERENCE

This application is a continuation of U.S. application Ser. No. 13/843,151, titled "Method and Device for Filling Video Ad Requests with Video Ad Content Transcoded in Real Time to a Stream at a Temporary URL", filed 15 Mar. 2013. The priority application is incorporated by reference herein for all purposes.

BACKGROUND

Field

The technology disclosed relates to filling video ad requests with video ad content that begins in a format incompatible with the mobile device that is requesting the ad content. In particular, it relates to accessing available ad content, transcoding the ad content to a video stream and publishing the video stream to the mobile device that requested the ad content. This sometimes requires synchronization between a player on the mobile device and the video stream transcoder.

Related Art

Animated and video advertising to desktop computers was popularized by Adobe with the Flash format. However, a number of companies decided that the Flash format required too much computing to be practical for mobile devices.

A great deal of ad content remains available primarily in FLV format. Ad servers and ad exchanges routinely respond to fill requests for video ad content with URLs to FLV formatted content. More generally, as mobile devices evolve and devices such as TVs, set-top boxes and DVD players become connected to the Internet, there will be mismatches between the format of advertising content and the display capabilities of these devices.

It is desirable to provide a platform for filling video ad requests with video ad content that begins in a format incompatible with the requesting device.

SUMMARY

The technology disclosed relates to filling video ad requests with video ad content that begins in a format incompatible with the mobile device that is requesting the ad content. In particular, it relates to accessing available ad content, transcoding the ad content to a video stream and publishing the video stream to the mobile device that requested the ad content. This sometimes requires synchronization between a player on the mobile device and the video stream transcoder. Other aspects and advantages of the technology disclosed can be seen on review of the drawings, the detailed description and the claims, which follow.

BRIEF DESCRIPTION OF THE DRAWINGS

FIG. 2 is a sample Digital Video Ad Streaming Template (VAST) ad availability record.

DETAILED DESCRIPTION

Figure 1:
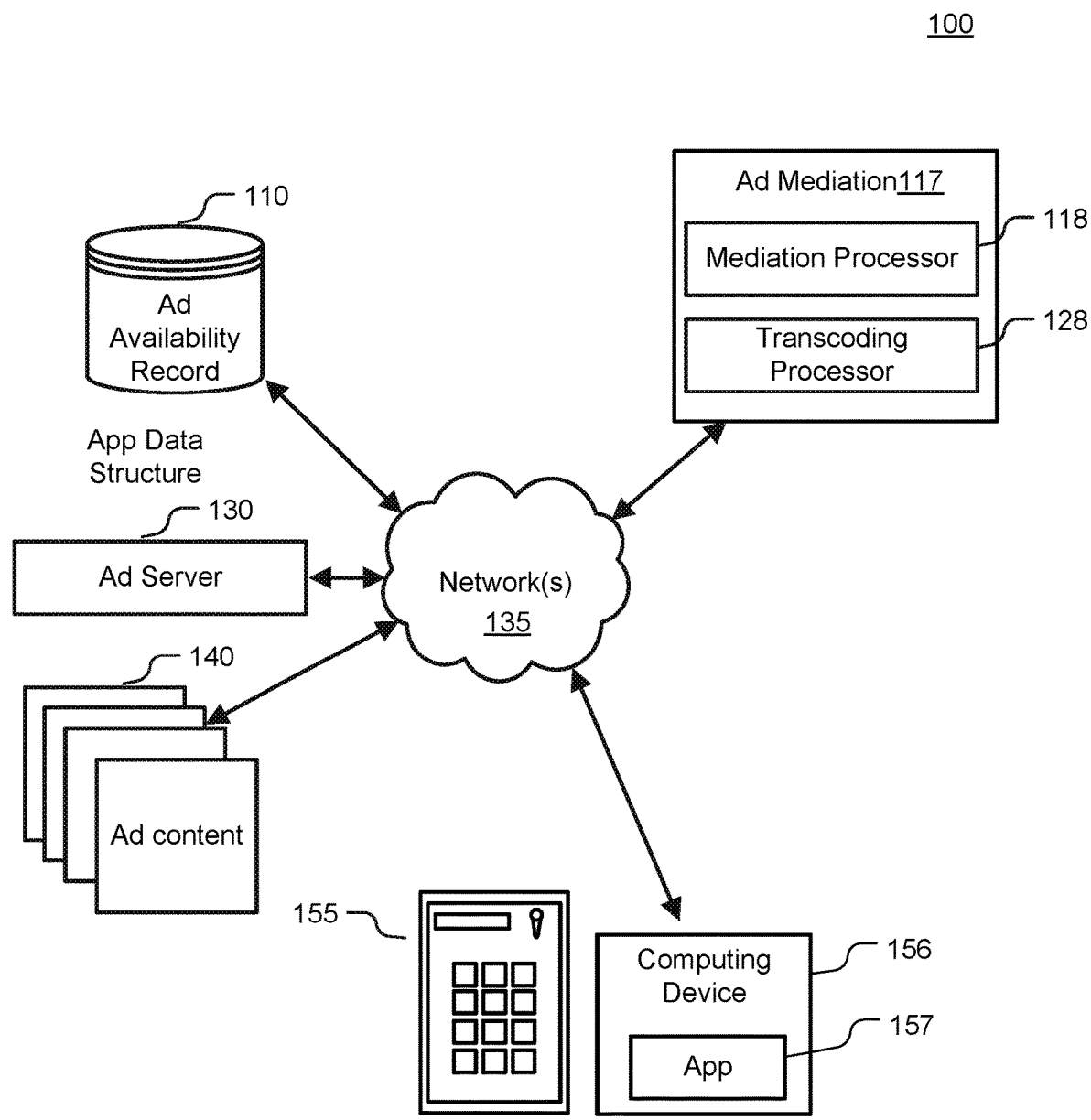
FIG. 1 is a high level a block diagram of an example environment in which an ad mediation server adapts video ads from an incompatible format to one that run satisfactorily on a requesting device
Figure 3:
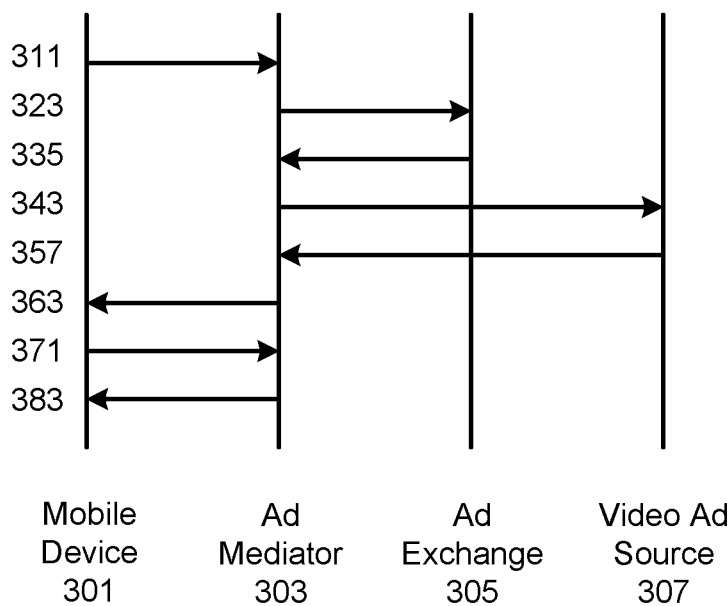
FIG. 3 is a message exchange diagram for an example implementation.

A detailed description of implementations of the technology disclosed is provided with reference to the FIGS. 1-3.

The technology disclosed addresses a niche of advertising. It is particularly well adapted for use with the Digital Video Ad Serving Template (VAST) standard promulgated by the IAB Digital Video Committee, which currently is reached version 3 as of September, 2012.

A substantial percentage of video advertising fill requests go unfulfilled at present because the available video and animated ad content is made available in formats that are incompatible with mobile devices that request advertising fill. An ad server may, for instance, request a video ad to run on an iPhone®, only to find that the VAST ad availability record that receives identifies content in an FLV format. Since the iPhone does not support Flash decoding, the video ad cannot be delivered.

The technology disclosed involves recognizing that the ad availability record specifies an incompatible format, transcoding the ad content to a compatible format, and streaming it from a substitute URL to a player on the requesting mobile device. An availability record is modified before forwarding to the mobile device to direct the mobile device to the substitute URL.

Transcoding on-the-fly can be accomplished in memory, without needing to buffer the entire video ad content. Communications between the transcoding processor and a video display client or video player running on the device requesting the video ad content can synchronize the transcoding so that streaming does not begin until the player is ready. Additional communications between the transcoding processor and the video player can pause, restart, replay or skip the video ad content.

FIG. 1 is a high level block diagram of an example environment 100 in which an ad mediation server 117 adapts video ads from an incompatible format to one that run satisfactorily on a mobile device 155. The environment 100 includes at least one mobile device 155 that includes a computing device 156 processor and at least one application 157 running on the processor. An ad mediation server 117 includes a mediation processor 118 and a transcoding processor 128. One or more ad servers 130 serve up an availability record 110 and ad content 140 listed in the ad availability record's 110. The environment includes a communications network 135 that allows for communication among the various components of the environment. During operation, the mobile devices 155 request the so-called fill a video ad space. The ad mediation server 117 obtains from the ad server 130 and at availability record. A mediation processor 118 recognizes that the available ad is in a format incompatible with the mobile device 155. The system transcodes the available ad content 140 video stream using a transcoding processor 128. The mediation processor 118 provides the mobile device 155 with a substitute URL with which to access the streaming video ad content.

In one implementation, the network 135 includes the Internet. The network 135 also can utilize dedicated or private communication links that are not necessarily part of the Internet. In one implementation, the network 135 uses standard communication technologies, protocols and/or inter-process communication technologies.

Mobile devices 155 execute applications 157 such as video players. The mobile devices 155 may include a tablet computer or mobile phone. The technology disclosed can also be applied in environments that include other devices with limited video display capabilities, such as connected TVs, set-top boxes and DVD players. These devices have limited capabilities, in the sense that they expect to receive video in a particular format.

The ad mediation server 117 can be implemented in hardware, firmware, or software running on the hardware. Software that is combined with the hardware to carry out the actions of ad mediation 117 can be stored on computer readable media such as rotating or nonrotating memory. The nonrotating memory can be volatile or nonvolatile. In this application, computer readable media does not include a transitory electromagnetic signal that is not stored in memory; computer readable media stores instructions for execution. The ad mediation server 117 can be implemented on a real or virtual machine running on a real machine. It can be implemented on one machine, cluster of machines, distributed machines or even using cloud computing resources such as Amazon's EC2.

The ad server 130 may be an ad network, potentially supported by one or more content distribution networks.

FIG. 2 is a sample VAST ad availability record 200. Similar ad availability records may comply with VAST version 3.0 or a later version of the VAST family of specifications promulgated by the Interactive Advertising Bureau (IAB) Digital Video Committee or its successor. The format of a particular ad being served by this ad availability record is specified by a URL 250. In this instance, the ad is an FLV format.

The technology disclosed transcodes the specified FLV or other incompatible video format to a video for format usable by a mobile device that has requested an ad fill. It streams the transcoding ad video from a URL temporarily allocated for streaming this ad. The temporarily allocated URL is substituted in the ad availability record 200 for the incompatible FLV URL 250. Typically, the modified ad availability record is forwarded to a player on the mobile device. Alternatively, the temporary URL could be forwarded with information extracted from the ad availability record in a more easily processed format, such as JSON.

FIG. 3 is a message exchange diagram for ad example implementation. While four devices are indicated as being involved in the communications, additional devices may be involved or a single device may serve multiple roles, such as one server cluster handling both ad exchange and video ad source roles. In addition, other layers may be interposed, such as a content delivery network (CDN). Those other layers are amended for the sake of clarity.

In one implementation, delivery of transcoded video ad content involves a mobile device 301, an ad mediator 303, an ad exchange 305, and a video ad source 307. Again, devices responding to a video ad fill request may be servers, cloud-based computing resources, workstations, etc. For convenience, the method illustrated is described with reference to the system that can be used to implement it. The mobile device 301 sends an ad fill request 311 to the ad mediator 303. The ad mediator sends a request 323 to an ad exchange 305 for video ad content. The ad exchange responds with an ad availability record 335. The ad mediator 303 recognizes that the content specified in the ad availability record 335 is incompatible with the display capabilities of the mobile device 301. It configures the transcoder to convert the available video ad content to a format usable by the mobile device 301. It allocates a URL from which transcoded video content streams. The ad mediator 303 requests the video ad content 343 from the specified video ad source 307. It receives the video ad content 357 for transcoding. The ad mediator 303 sends the mobile device 301 a message 363 that specifies the allocated URL at which the streaming video ad content will be available. The message 363 also may include information specified by an ad delivery standard such as VAST 2.0 or 3.0.

In some implementations, one or more messages 371, 373 can be exchanged between the mobile device 301 and ad mediator 303 to synchronize initiation of streaming the transcoded video ad content. Messages also can be exchanged to pause or otherwise control streaming to the mobile device.

Particular Implementations

In one implementation, a method that fills ad space is described with video ads to show on mobile devices that have limited display capability. This method includes receiving an ad availability record with a source URL for video ad content that is in a format incompatible with a requesting device that is requesting ad content and allocating a URL from which to stream the requested ad content. The method further includes responding to the request by sending at least the allocated URL and some information from the ad delivery record to the requesting device and automatically transcoding the ad content to a live video stream accessible at the allocated URL in a format compatible with the requesting device.

This method in other implementations of the technology disclosed can each optionally include one or more the following features.

The requesting device can be a mobile device with a limited video display capability.

The method can include retrieving the video ad content from an ad source server after receiving the ad availability record.

The ad availability record can be compatible with a display video ad serving template standard, abbreviated VAST. This can be any standards in the family of standards promulgated by the Interactive Advertising Bureau's Digital Video Committee. Two of the standards in this family are version 2.0 released in November 2009 and version 3.0 released in September 2012.

Sending can further include forwarding the ad availability record with the allocated URL substituted for the source URL.

The method can further include exchanging messages with a video player to synchronize the start of streaming with readiness of the player to stream. It can include exchanging messages with a video player to pause or cancel transcoding responsive to directions from the video player.

The method can further include identifying the format compatible for video streaming to the particular mobile device and automatically adjusting transcoding parameters to match the particular mobile device. This may be extended to include identifying a change in the format for video streaming being used by the particular mobile device and automatically readjusting transcoding parameters to match.

Other implementations may include a non-transitory computer readable storage medium storing instructions executable by a processor to perform one or more methods as described above. Yet another implementation may include a system including memory and one or more processors operable to execute instructions, stored in memory to perform any of the methods described above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of filling ad space with video ads to show on mobile devices that have limited display capability, including:
   receiving an ad availability record, compatible with a video ad serving template standard, with a source URL for video ad content that is in a format incompatible with a device that is requesting ad content;
   allocating a URL from which to stream the requested ad content;
   responding to the request for the ad content by
      sending at least the allocated URL and some information from the ad availability record to the requesting device;
      identifying a change in the format for video streaming being used by the particular mobile device and automatically adjusting transcoding parameters to match; and
      automatically transcoding the ad content to a live video stream accessible at the allocated URL in a format compatible with the requesting device.

2. The method of claim 1, wherein the requesting device is a mobile device with a limited video display capability that is incompatible with the video ad content at the source URL.

3. The method of claim 1, further including retrieving the video ad content from an ad source server after receiving the ad availability record.

4. The method of claim 1, wherein the ad availability record is compatible with a display video ad serving template (VAST) standard.

5. The method of claim 1, further including exchanging messages with a video player to synchronize a streaming start with the video player's readiness to stream.

6. The method of claim 1, further including exchanging messages with a video player to pause or cancel transcoding responsive to directions from the video player.

7. The method of claim 1, further including identifying the format compatible for video streaming to the particular mobile device and automatically adjusting transcoding parameters to match the particular mobile device.

8. A computer readable storage medium including program instructions that, when executed, configure a processor to perform actions including:
   receiving an ad availability record, compatible with a video ad serving template standard, with a source URL for video ad content that is in a format incompatible with a device that is requesting ad content;
   allocating a URL from which to stream the requested ad content;
   responding to the request for the ad content by:
      sending at least the allocated URL and some information from the ad availability record to the requesting device;
      identifying a change in the format for video streaming being used by the particular mobile device and automatically adjusting transcoding parameters to match; and
      automatically transcoding the ad content to a live video stream accessible at the allocated URL in a format compatible with the requesting device.

9. The computer readable storage medium of claim 8, the instructions further including configuring the processor to receive an indication of video format incompatibility from a mobile device with a limited video display capability.

10. The computer readable storage medium of claim 8, the instructions stored in the memory further cause the processor to retrieve the video ad content from an ad source server after receiving the ad availability record.

11. The computer readable storage medium of claim 8, wherein the ad availability record is compatible with a display video ad serving template (VAST) standard.

12. The computer readable storage medium of claim 8, further including exchanging messages with a video player to synchronize a streaming start with the video player's readiness to stream.

13. The computer readable storage medium of claim 8, further including exchanging messages with a video player to pause or cancel transcoding responsive to directions from the video player.

14. The computer readable storage medium of claim 8, further including identifying the format compatible for video streaming to the particular mobile device and automatically adjusting transcoding parameters to match the particular mobile device.

15. A system that delivers video ads to show on mobile devices that have limited display capability, the system including a processor, memory coupled to the processor, and instructions in the memory that, when executed, cause the processor to perform actions including:
   receiving an ad availability record, compatible with a video ad serving template standard, with a source URL for video ad content that is in a format incompatible with a device that is requesting ad content;
   allocating a URL from which to stream the requested ad content;
   responding to the request for the ad content by
      sending at least the allocated URL and some information from the ad availability record to the requesting device;
      identifying a change in the format for video streaming being used by the particular mobile device and automatically adjusting transcoding parameters to match; and
      automatically transcoding the ad content to a live video stream accessible at the allocated URL in a format compatible with the requesting device.

16. The system of claim 15, the instructions stored in the memory further cause the processor to retrieve the video ad content from an ad source server after receiving the ad availability record.

17. The system of claim 15, the instructions stored in the memory further cause the processor to exchange messages with a video player to synchronize the start of streaming with readiness of the player to stream.

* * * * *